United States Patent
Ichinose et al.

(10) Patent No.: US 8,129,851 B2
(45) Date of Patent: Mar. 6, 2012

(54) WIND POWER GENERATION SYSTEM AND CONTROL METHOD THEREOF

(75) Inventors: Masaya Ichinose, Hitachiota (JP); Motoo Futami, Hitachiota (JP); Hiromitsu Sakai, Tokai (JP); Kojiro Yamashita, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 500 days.

(21) Appl. No.: 12/131,225

(22) Filed: Jun. 2, 2008

(65) Prior Publication Data

US 2008/0304188 A1    Dec. 11, 2008

(30) Foreign Application Priority Data

Jun. 5, 2007   (JP) ................................. 2007-148725

(51) Int. Cl.
*H02H 7/06*    (2006.01)

(52) U.S. Cl. ................. 290/44; 361/20; 290/45; 290/50
(58) Field of Classification Search ...................... 290/44
See application file for complete search history.

(56) References Cited

U.S. PATENT DOCUMENTS 7,253,537 B2 *   8/2007   Weng et al. ..................... 290/44

(Continued)

FOREIGN PATENT DOCUMENTS

CN    1625831    6/2005

(Continued)

OTHER PUBLICATIONS

U.S. Appl. No. 11/769,753, filed Jun. 28, 2007, Ichinose et al.

(Continued)

*Primary Examiner* — Rexford Barnie
*Assistant Examiner* — Angela Brooks
(74) *Attorney, Agent, or Firm* — Antonelli, Terry, Stout & Kraus, LLP.

(57) ABSTRACT

In a wind power generation system, an energy consuming unit is connected to a DC part of a generator-side converter. A shunt circuit is connected between the generator-side converter and a rotor of an AC-excited power generator. In the event of system failure, the switching operation of the converter is stopped, the shunt circuit is put into operation, and the energy consuming unit is put into operation so that DC voltage (voltage of the DC part) is maintained within a prescribed range.

22 Claims, 13 Drawing Sheets

U.S. PATENT DOCUMENTS

| | | | |
|---|---|---|---|
| 7,518,256 B2 * | 4/2009 | Juanarena Saragueta et al. | 290/44 |
| 2002/0079706 A1 * | 6/2002 | Rebsdorf et al. | 290/55 |
| 2007/0278797 A1 * | 12/2007 | Flannery et al. | 290/44 |
| 2008/0296989 A1 * | 12/2008 | Fujita et al. | 310/156.44 |
| 2009/0079191 A1 * | 3/2009 | Mari et al. | 290/43 |
| 2009/0212568 A1 * | 8/2009 | Maibach et al. | 290/44 |
| 2009/0251000 A1 * | 10/2009 | Su | 307/9.1 |
| 2009/0322083 A1 * | 12/2009 | Wagoner et al. | 290/44 |

FOREIGN PATENT DOCUMENTS

| | | |
|---|---|---|
| CN | 1823467 | 8/2006 |
| JP | 07-131928 | 5/1995 |
| JP | 10-032998 | 2/1998 |
| JP | 2006-230085 | 8/2006 |
| JP | 2007-244136 | 9/2007 |
| WO | WO 2005015730 A1 * | 2/2005 |

OTHER PUBLICATIONS

U.S. Appl. No. 11/751,742, filed May 22, 2007, Ichinose et al.
U.S. Appl. No. 11/954,453, filed Dec. 12, 2007, Ichinose et al.
U.S. Appl. No. 12/116,272, filed May 7, 2008, Ichinose et al.
U.S. Appl. No. 12/128,121, filed May 28, 2008, Ichinose et al.
Eizo Kita, et al., "400-MW Adjustable-Speed Pumped-Storage Hydraulic Power Plant", Hitachi Review, 1995, vol. 44.

* cited by examiner

WIND POWER GENERATION SYSTEM AND CONTROL METHOD THEREOF

CROSS-REFERENCE TO RELATED APPLICATION

The present application relates to subject matters described in a co-pending patent application Ser. No. 11/769,753 filed on Jun. 28, 2007 entitled "VARIABLE SPEED WIND POWER GENERATION SYSTEM", Ser. No. 11/751,742 filed on May 22, 2007 entitled "WIND POWER GENERATION APPARATUS, WIND POWER GENERATION SYSTEM AND POWER SYSTEM CONTROL APPARATUS", Ser. No. 11/954,453 filed on Dec. 12, 2007 entitled "WIND POWER GENERATION SYSTEM", Ser. No. 11/116,272 filed on May 7, 2008 entitled "WIND POWER GENERATION SYSTEM AND OPERATING METHOD THEREOF" and Ser. No. 12,128,121 to be filed on May 28, 2008 entitled "WIND POWER GENERATION SYSTEM AND METHOD OF CONTROLLING POWER CONVERTER" every which by Masaya Ichinose, et al. and assigned to the assignees of the present application. The disclosures of these co-pending applications are incorporated herein by reference.

BACKGROUND OF THE INVENTION

The present invention relates to a wind power generation apparatus, and in particular, to an apparatus and a method for protecting a converter of the wind power generation apparatus from overcurrent, etc. when a voltage drop (power outage, etc) occurs to an electric power system which is connected to the wind power generation apparatus.

In an AC-excited generator employed for a power generation apparatus, the frequency of voltage caused by the rotor excitation to the stator-side of the generator can be made equal to system frequency, by making the power converter excite the rotor winding with AC current at a slip frequency (the difference between the system frequency and the frequency of revolution). Making the rotor excitation frequency (or the slip frequency) variable has various advantages. For example, the revolving speed of the wind turbine of the wind power generation apparatus can be made variable, while also making the capacity of the power converter smaller than that of the generator.

However, when a voltage drop (ground fault, etc.) occurs in the power system connected to the wind power generation apparatus, the AC-excited generator operates so as to supply electric current to the point of the failure. In this case, excessive current is induced in the rotor winding, causing excessive current passing through the excitation converter connected to the rotor-side of the generator. In order to prevent trouble caused by the excessive current (overcurrent), a device called "crowbar", for short-circuiting the rotor circuit by use of a thyristor, is used, for example.

In recent years, standards, specifying that the operation of a wind power generation apparatus should be continued even in the event of the power system failure without disconnecting the wind power generation system from the power system, have been set up in Europe, etc. Under such circumstances, system operation capable of minimizing ill effects on the power system is being desired.

The AC-excited generators have been used mainly for large-scale power generation systems (e.g. pumped-storage power plants), for which an operation method, short-circuiting the rotor circuit by use of externally commuted elements in the event of major power outage in the system, has been employed so far.

An example of a conventional power generation system is disclosed in "400-MW Adjustable-Speed Pumped-Storage Hydraulic Power Plant" by Eizo Kita, et al., HITACHI REVIEW, 1995, Vol. 44. JP-A-2006-230085 and JP-A-2007-244136 disclose a power conversion device for exciting a secondary excitation type generator in which a power converter is protected from overcurrent to secure the operation of the power converter.

SUMMARY OF THE INVENTION

The primary object of the present invention is to prevent a capacitor in a DC part of the excitation power converter of a wind power generation system from being overcharged to an excessively high voltage (overvoltage) by energy of overcurrent which is caused by power system failure or power system disturbance to the rotor winding of the AC-excited generator, and to realize quick restart of the operation (without the need of disconnecting the system connection point immediately after the recovery of the power system.

In order to achieve the above object, at least an overcurrent consuming unit is connected to the DC part of the converter in wind power generation systems and control methods in accordance with the present invention.

With the wind power generation systems and control methods, the overcharging of the capacitor in the DC part of the excitation power converter to an excessively high voltage (overvoltage) by the energy of the overcurrent can be prevented even in the event of power system failure or power system disturbance.

Other objects, features and advantages of the invention will become apparent from the following description of the embodiments of the invention taken in conjunction with accompanying drawings.

DESCRIPTION OF THE EMBODIMENTS

Figure 1:
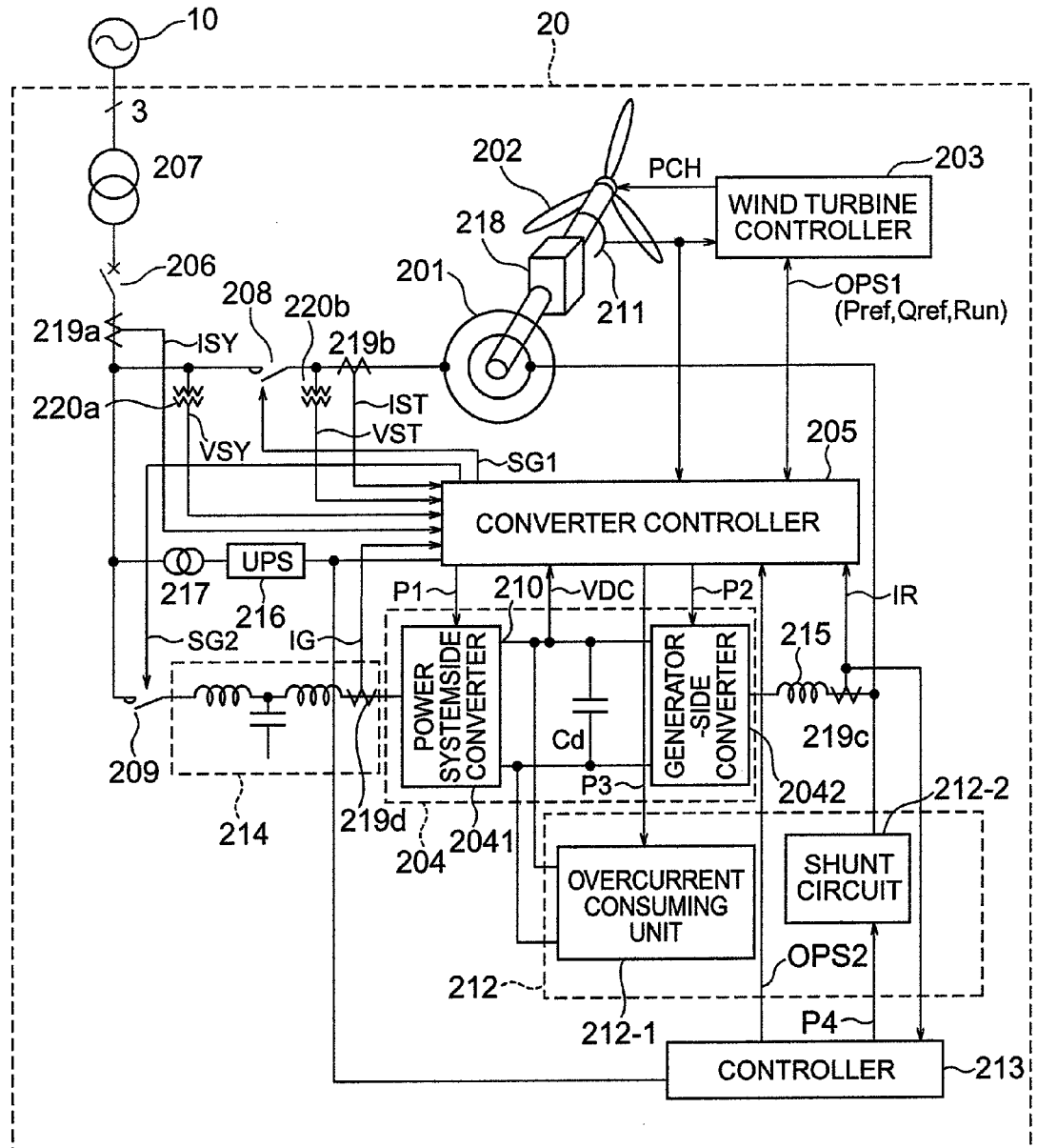
FIG. 1 is a schematic circuit diagram (single-line wiring diagram) showing the circuit configuration of a wind power generation apparatus in accordance with a first embodiment of the present invention.

Referring now to the drawings, a description will be given in detail of preferred embodiments in accordance with the present invention.

In the embodiments described below, an energy consuming unit is connected to the DC part of the excitation converter. In the event of a system failure, the switching operation of the converter (system-side converter, generator-side converter) is stopped and the energy consuming unit is operated so that DC voltage (voltage of the DC part) is kept within a prescribed range.

Embodiment 1

FIG. 1 is a schematic circuit diagram (single-line wiring diagram) showing the circuit configuration of a wind power generation apparatus 20 in accordance with a first embodiment of the present invention.

The wind power generation apparatus 20 is connected to a power system 10 via power lines. The wind power generation apparatus 20 is mainly composed of a generator 201, blades 202, a wind turbine controller 203, a converter (excitation apparatus) 204, a converter controller 205, a system failure countermeasure unit 212 and a system failure countermeasure unit controller 213.

The blades 202 are mechanically connected to the rotor of the generator 201 (via gears 218 or the like). The rotor winding of the generator 201 is electrically connected to the converter 204. The stator of the generator 201 is electrically connected to the power system 10 via a circuit breaker 206, a coupling transformer 207, etc.

The wind turbine controller 203 detects wind speed, controls the angle of the blades 202 so as to properly maintain the revolving speed of the wind turbine, and generates operation command signals OPS1 (including an active power command value Pref, a run/stop command value Run and a reactive power command value Qref) by executing calculations.

The operation command signals OPS1 (the reactive power command value Qref, the active power command value Pref, the run/stop command value Run, etc.) generated by the wind turbine controller 203 are sent to the converter controller 205, while a blade angle command value Pch (calculated by the wind turbine controller 203 so as to properly maintain the revolving speed of the wind turbine) is sent to a blade angle modification unit which modifies the angle of the blades 202.

The converter controller 205 controls voltages outputted by the converter 204 so as to comply with the command values and thereby controls electric power (generated power, reactive power) between the generator 201 and the power system.

Next, the converter (excitation apparatus) 204, the converter controller 205, the system failure countermeasure unit 212 and the power system failure countermeasure unit controller 213 will be briefly explained below. The three-phase output on the stator side of the generator 201 is connected to the power system 10 via a switch that can be opened/closed by an external signal SG1 (e.g. circuit breaker 208), the circuit breaker 206 and the system coupling transformer 207. Meanwhile, a circuit on the circuit breaker 208 side of the circuit breaker 206 (i.e. circuit between the circuit breakers 206 and 208) is connected to an AC filter circuit 214 and a system-side converter 2041 via another circuit breaker 209.

A DC part 210 of the system-side converter 2041 is connected to a DC circuit of a generator-side converter 2042. The AC output of the generator-side converter 2042 is connected to the rotor winding of the generator 201 via a reactor 215 for suppressing dV/dt.

An AC input terminal of a shunt circuit 212-2 of the system failure countermeasure unit 212 is connected to an end of the dV/dt suppression reactor 215 on the generator rotor side. DC output terminals of an overcurrent consuming unit 212-1 of the system failure countermeasure unit 212 are connected to the DC part 210 of the system-side converter 2041 and the generator-side converter 2042.

The converter controller 205 is backed up by an uninterruptible power supply (UPS) 216, and thus electric power is supplied from the uninterruptible power supply 216 to the converter controller 205 when the system voltage drops. The system failure countermeasure unit controller 213 (for outputting a command signal to the shunt circuit 212-2 of the system failure countermeasure unit 212) is also backed up by the uninterruptible power supply 216, and thus electric power is supplied from the uninterruptible power supply 216 to the system failure countermeasure unit controller 213 when the system voltage drops.

The circuit breaker 206 is used (opened) for interrupting electric current and thereby protecting the wind power generation apparatus 20 when excessive current continues, for electrically disconnecting the system 20 (wind power generation apparatus) from the power system 10 when the system 20 is totally stopped, etc.

The generator-side converter 2042 and the system-side converter 2041, formed with semiconductor switching elements (thyristor, GTO, IGBT, MOS, SiC, etc.) for example, have the function of converting an alternating current into a direct current or converting a direct current into an alternating current.

The AC output terminals of the system-side converter 2041 are provided with the AC filter circuit 214 (including a reactor, capacitor, etc.), which attenuates and suppresses harmonic current and harmonic voltage.

The rotating part of the generator 201, to which the blades 202 for the wind power generation are connected via the gears 218, is rotated by wind force received by the blades 202. The rotating part is equipped with a device for detecting its rotational position (e.g. encoder 211), from which a revolving speed signal (angular speed signal) ω is outputted. The revolving speed signal ω is supplied to the wind turbine controller 203 and the converter controller 205.

Next, wiring and apparatus for controlling the generated electric power will be described below. The three-phase voltage and the three-phase current on the secondary side of the circuit breaker 206 are converted into a voltage detection signal (as a low-voltage signal) and a current detection signal (as a low-voltage signal) by a voltage sensor 220a and a current sensor 219a, respectively. The system voltage detection value VSY (i.e. the voltage detection signal) and the system current detection value ISY (i.e. the current detection signal) are inputted to the converter controller 205.

The voltage on the secondary side of the circuit breaker 208 (between the circuit breaker 208 and the stator of the generator 201) is detected by a voltage sensor 220b as a stator voltage detection value VST, converted into a low-voltage signal, and inputted to the converter controller 205.

DC voltage VDC of a capacitor Cd which is connected to the DC part 210 of the converter 204 is converted by a voltage sensor into a DC voltage signal (as a low-voltage signal) and inputted to the converter controller 205.

Generator-side converter current IR is detected by a current sensor 219c, while system-side converter current IG is detected by a current sensor 219d. The generator-side converter current IR and the system-side converter current IG are also inputted to the converter controller 205.

The wind turbine controller 203 has the function of sending the various command values (the run/stop command value Run, the active power command value Pref, the reactive power command value Qref, etc.) to the converter controller 205, detecting state quantities of the wind turbine and the system and communicating with the outside (communication function), etc.

The converter controller 205 controls the circuit breakers 208 and 209 with signals SG1 and SG2, respectively, while outputting pulse signals P1 and P2 for the drive control of the system-side converter 2041 and the generator-side converter 2042 (formed with semiconductor switching elements), respectively.

The converter controller 205 is connected to the uninterruptible power supply 216 to be operable even when the system voltage drops. The uninterruptible power supply 216 is supplied with voltage that has been regulated by a transformer 217. Electric power for the converter controller 205 is supplied from the system voltage when the input voltage of the uninterruptible power supply 216 is normal, while the electric power is supplied from an energy storage element (e.g. battery) of the uninterruptible power supply 216 when the system voltage is abnormal.

Figure 2:
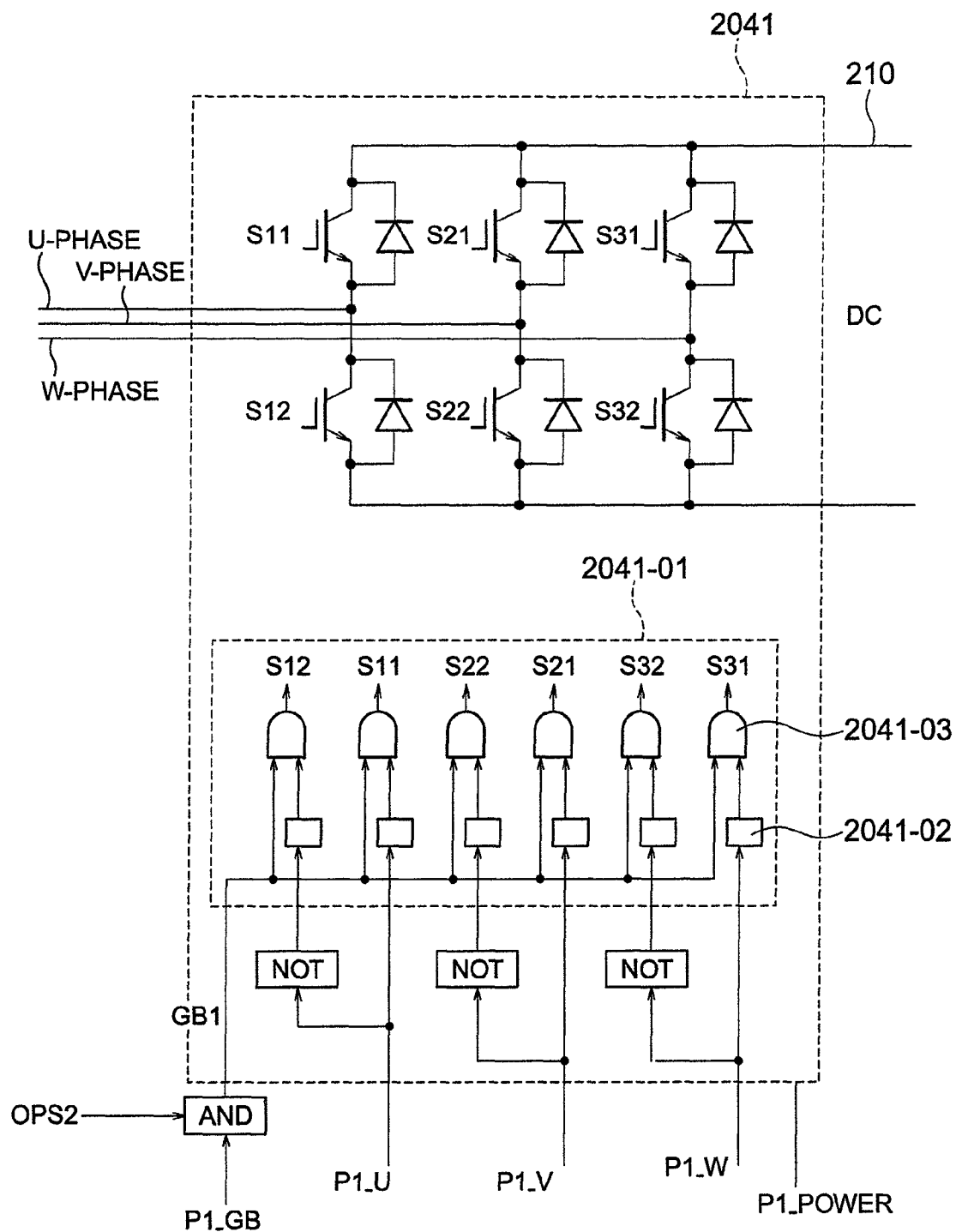
FIG. 2 is a schematic circuit diagram showing the configuration of a system-side converter included in the wind power generation apparatus of FIG. 1.

FIG. 2 is a schematic circuit diagram showing the configuration of the system-side converter 2041. The system-side converter 2041 is formed with semiconductor elements, etc. The configuration of a three-phase converter formed with semiconductor elements S11, S12, S21, S22, S31 and S32 (each of which is formed of an IGBT and a diode) is shown in FIG. 2. The elements S11 and S12 form the top and bottom arms for the U-phase, the elements S21 and S22 form the top and bottom arms for the V-phase, and the elements S31 and S32 form the top and bottom arms for the W-phase.

Three-phase AC voltages are caused to the AC terminals by the ON/OFF switching of the IGBTs (Insulated Gate Bipolar Transistors) of the semiconductor elements. The system-side converter current IG can be controlled by regulating the AC voltages.

Gate signals P1 (P1_GB, P1_U, P1_V, P1_W) for turning the semiconductor elements ON and OFF are supplied from the converter controller 205. The gate signals P1_U, P1_V and P1_W (with the suffixes "U", "V" and "W") are gate signals for the U-phase, V-phase and U-phase, respectively.

The U-phase bottom arm element S12 is supplied with a gate signal as the inversion of that for the U-phase top arm element S11 (the element S12 is OFF when the element S11 is ON). Also regarding the V-phase and W-phase, the bottom arm (S22, S32) is supplied with a gate signal as the inversion of that for the top arm (S21, S31). Inverters NOT are used for obtaining the inverted signals. In order to prevent short-circuiting of the top and bottom arms, a time period called "dead time" is given to each of the gate signals S11-S32 by each short prevention circuit 2041-02 formed in a gate circuit 2041-01.

A gate block signal P1_GB and an operation status signal OPS2 are used for stopping the ON/OFF switching of the semiconductor elements. A gate block signal GB1 is obtained by an AND circuit which calculates the logical product of the gate block signal P1_GB and the operation status signal OPS2. The gate block signal GB1 becomes "0" when either the gate block signal P1_GB or the operation status signal OPS2 represents a gate block state "0". The gate block signal GB1 is inputted to an AND circuit 2041-03 together with the pulse signal P1 (P1_U, P1_V, P1_W). The gate block signal GB1 becomes "0" when the gates of the semiconductor elements S11-S32 should be stopped, by which the semiconductor elements S11-S32 are kept in the OFF state irrespective of the status of each pulse signal P1 (P1_U, P1_V, P1_W).

Incidentally, gate circuit power P1_POWER necessary for the ON/OFF switching of the elements of the system-side converter 2041 is supplied from the converter controller 205.

Figure 3:
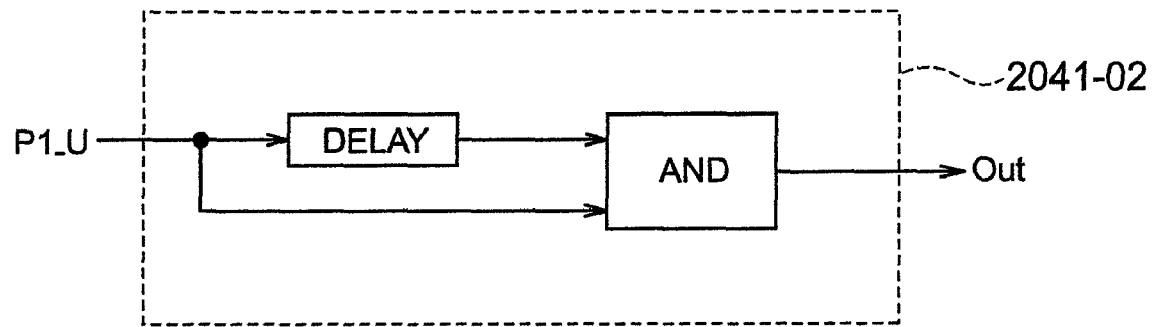
FIG. 3 is a schematic circuit diagram showing the configuration of a short prevention circuit included in the wind power generation apparatus of FIG. 1.

FIG. 3 is a schematic circuit diagram showing the configuration of the short prevention circuit 2041-02. A time delay adder DELAY adds a time delay (corresponding to a short prevention period) to the pulse signal P1 (e.g. P1_U) inputted to the short prevention circuit 2041-02. The signal with the time delay and the original input signal are inputted to an "AND" calculator which calculates the logical product of the signals, by which an output signal Out is obtained as the original input signal to which an ON delay (delay time: Td) has been added. With the ON delay given to each of the signals for the top and bottom arms, the bottom arm switching element turns from OFF to ON after the ON delay time Td has passed since the turning OFF of the top arm switching element, for example, by which the transient simultaneous ON state of the top and bottom arm switching elements is avoided and the DC short circuit is prevented.

Figure 4:
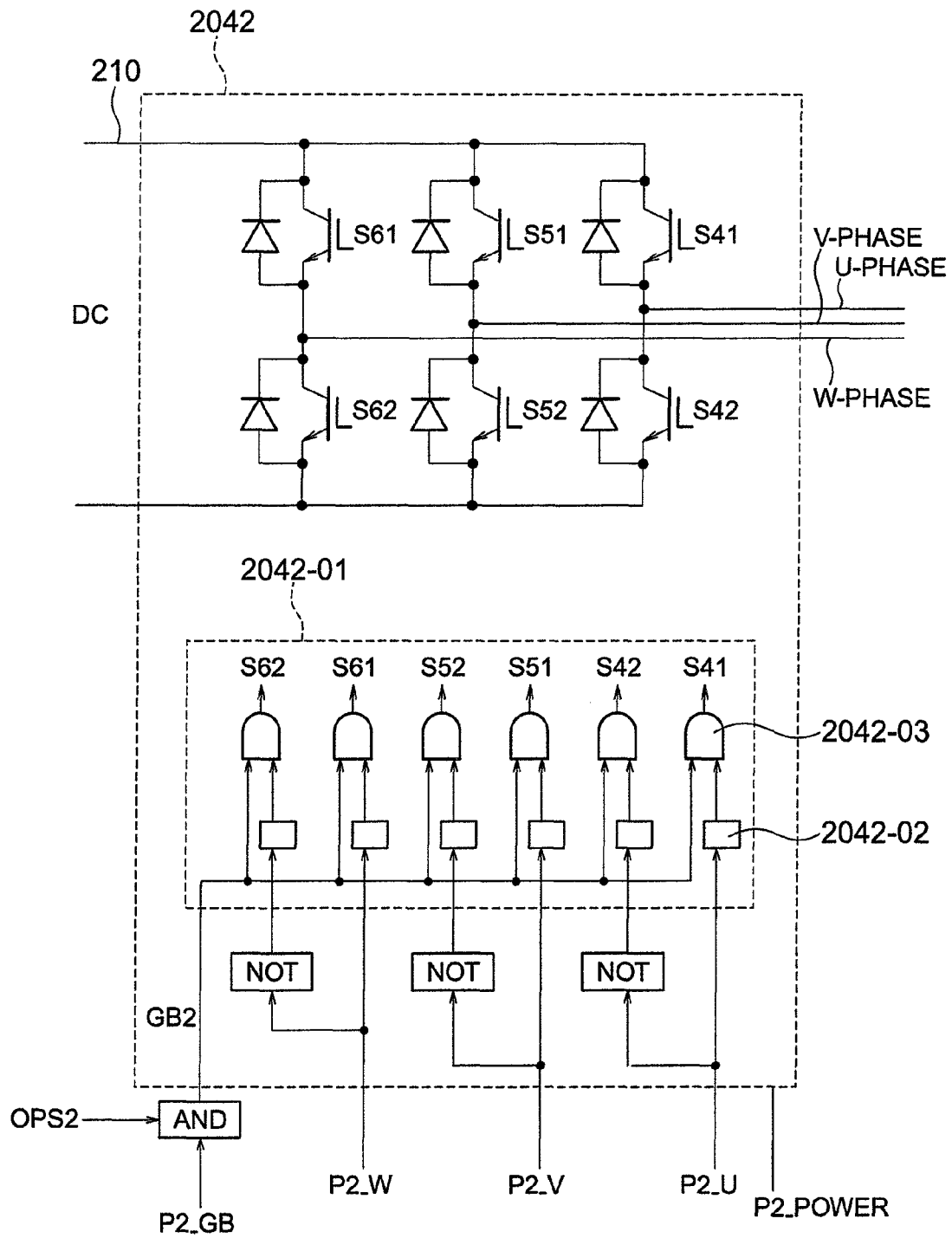
FIG. 4 is a schematic circuit diagram showing the configuration of a generator-side converter included in the wind power generation apparatus of FIG. 1.

FIG. 4 is a schematic circuit diagram showing the configuration of the generator-side converter 2042. The generator-side converter 2042 is formed with semiconductor elements, etc. The configuration of a three-phase converter formed with semiconductor elements S41, S42, S51, S52, S61 and S62 (each of which is formed of an IGBT and a diode) is shown in FIG. 4. The elements S41 and S42 form the top and bottom arms for the U-phase, the elements S51 and S52 form the top and bottom arms for the V-phase, and the elements S61 and S62 form the top and bottom arms for the W-phase.

Three-phase AC voltages are caused to the AC terminals by the ON/OFF switching of the semiconductor elements. The generator-side converter current IR (output) can be controlled by regulating the AC voltages.

Gate signals P2 (P2_GB, P2_U, P2_V, P2_W) for turning the semiconductor elements ON and OFF are supplied from the converter controller 205. The gate signals P2_U, P2_V and P2_W (with the suffixes "U", "V" and "W") are gate signals for the U-phase, V-phase and U-phase, respectively.

The U-phase bottom arm element S42 is supplied with a gate signal as the inversion of that for the U-phase top arm element S41 (the element S42 is OFF when the element S41 is ON). Also regarding the V-phase and W-phase, the bottom arm (S52, S62) is supplied with a gate signal as the inversion of that for the top arm (S51, S61). Inverters NOT are used for obtaining the inverted signals. In order to prevent short-circuiting of the top and bottom arms, a time period called "dead time" is given to each of the gate signals S41-S62 by each short prevention circuit 2042-02 formed in a gate circuit 2042-01.

A gate block signal P2_GB and the operation status signal OPS2 are used for stopping the ON/OFF switching of the semiconductor elements. A gate block signal GB2 is obtained by an AND circuit which calculates the logical product of the gate block signal P2_GB and the operation status signal OPS2. The gate block signal GB2 becomes "0" when either the gate block signal P2_GB or the operation status signal OPS2 represents the gate block state "0". The gate block signal GB2 is inputted to an AND circuit 2042-03 together with the pulse signal P2 (P2_U, P2_V, P2_W). The gate block signal GB2 becomes "0" when the gates of the semiconductor elements S41-S62 should be stopped, by which the semiconductor elements S41-S62 are kept in the OFF state irrespective of the status of each pulse signal P2 (P2_U, P2_V, P2_W).

Incidentally, gate circuit power P2_POWER necessary for the ON/OFF switching of the elements of the generator-side converter 2042 is supplied from the converter controller 205.

Next, the functions of the converter controller 205 will be described below referring to FIGS. 5-8.

Figure 5:
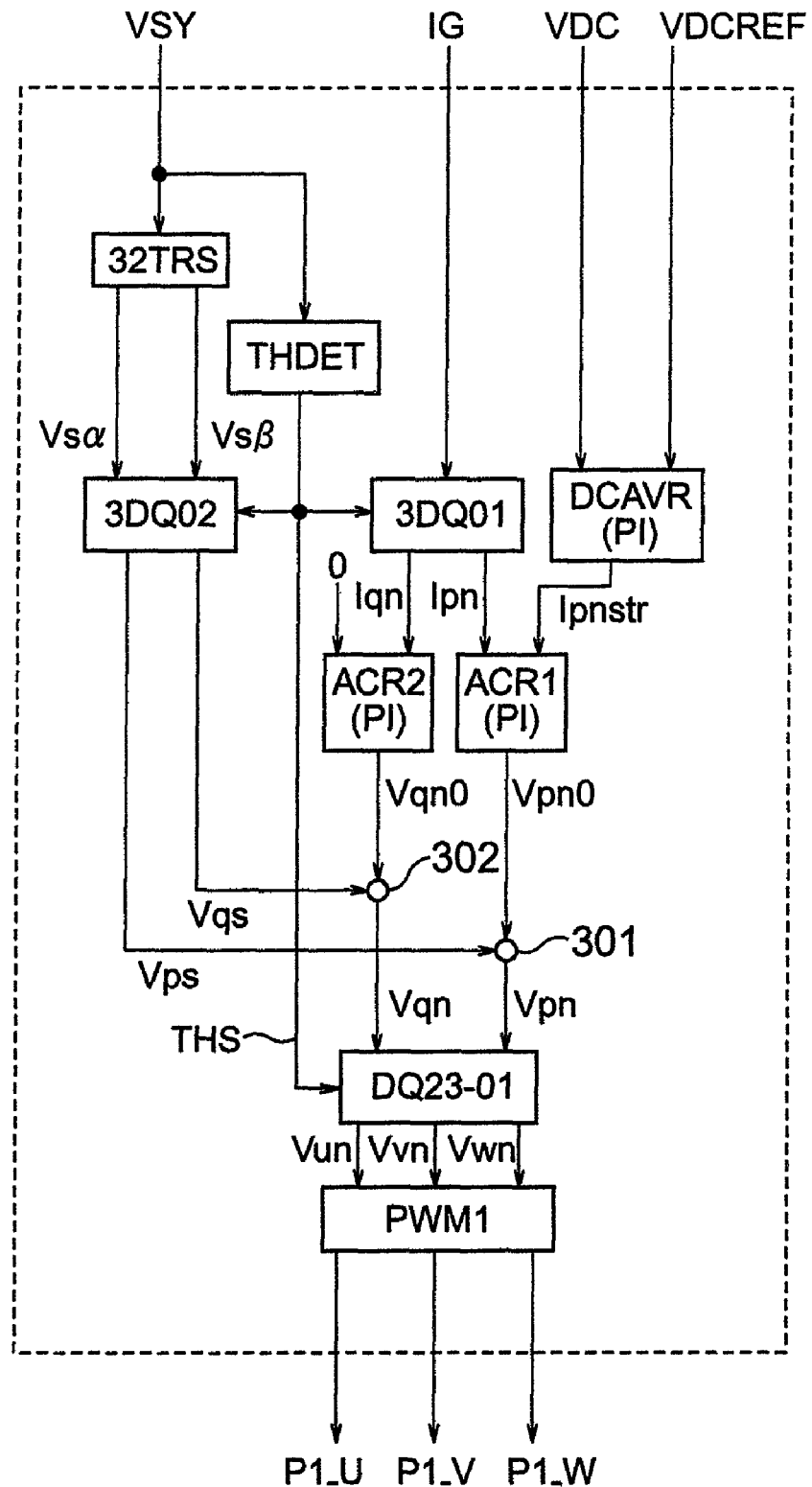
FIG. 5 is a schematic circuit diagram showing the control configuration of the system-side converter.

FIG. 5 is a schematic circuit diagram showing the control configuration of the system-side converter 2041. The system-side converter 2041 has the function of controlling the DC voltage VDC of the smoothing capacitor Cd to keep it at a constant level. Specifically, the system-side converter 2041 controls the DC voltage VDC by detecting the phase of the system voltage detection value VSY, controlling the current by use of the detected voltage phase, and exchanging the active power with the power system.

When the generator-side converter 2042 uses the DC power, the energy of the smoothing capacitor Cd is consumed and the DC voltage VDC drops. In this case, a DC voltage controller DCAVR of the system-side converter 2041 operates to maintain the DC voltage VDC at the constant level by charging the smoothing capacitor Cd by regulating active current Ipn (active power component). On the other hand, when the DC power is charged by the generator-side converter 2042 and the DC voltage VDC rises, the DC voltage controller DCAVR of the system-side converter 2041 operates to maintain the DC voltage VDC at the constant level by regulating the active current Ipn (active power component) so as to convert the DC power into AC power and discharge the AC power into the power system 10.

The smoothing capacitor Cd is charged up to a proper DC voltage VDC by a DC voltage initial charging circuit (unshown) before the system-side converter 2041 starts its operation. Thereafter, the command signal SG2 for turning the circuit breaker 209 ON is outputted by the converter controller 205, by which the system-side converter 2041 is connected to the system.

Referring to FIG. 5 showing the control configuration of the system-side converter 2041, the system voltage detection value VSY is inputted to a phase detector THDET and a three-to-two phase transformer 32TRS. The phase detector THDET calculates a phase signal THS (which follows the voltage of the system) by the PLL (Phase Locked Loop) method, for example, and outputs the phase signal THS (THS: phase signal when the system U-phase voltage is sinusoidal) to three-to-two phase rotating coordinate transformers 3DQ01 and 3DQ02 and a two-to-three phase rotating coordinate transformer DQ23-01. A DC voltage command value VDCREF and the DC voltage detection value VDC are inputted to a DC voltage regulator DCAVR (formed with a proportional-integral controller, for example). The DC voltage regulator DCAVR regulates its output (p-axis current command value (active current command value) Ipnstr) so that the deviation of the DC voltage detection value VDC from the DC voltage command value VDCREF (i.e. the difference between the two inputs) becomes 0, and outputs the regulated p-axis current command value Ipnstr to a current regulator ACR1.

The three-to-two phase rotating coordinate transformer 3DQ01 calculates a p-axis current detection value Ipn (active current) and a q-axis current detection value Iqn (reactive current) from the system-side converter current IG inputted thereto by use of the following three-to-two phase transformation equation (1) and rotating coordinate transformation equation (2), and outputs the p-axis current detection value Ipn and the q-axis current detection value Iqn to the current regulator ACR1 and a current regulator ACR2, respectively.

Incidentally, suffixes "U", "V" and "W" are used in this explanation to represent each phase of the three-phase alternating current. For example, "IGU" represents the U-phase component (U-phase current) of the system-side converter current IG. The suffixes are also used for voltages, values, etc. ("VSYU" represents the U-phase component of the system voltage detection value VSY, for example).

$$\begin{pmatrix} In\alpha \\ In\beta \end{pmatrix} = \frac{2}{3}\begin{pmatrix} \cos(0) & \cos(2\pi/3) & \cos(4\pi/3) \\ \sin(0) & \sin(2\pi/3) & \sin(4\pi/3) \end{pmatrix}\begin{pmatrix} IGU \\ IGV \\ IGW \end{pmatrix} \quad (1)$$

$$\begin{pmatrix} Ipn \\ Iqn \end{pmatrix} = \begin{pmatrix} \sin(THS) & -\cos(THS) \\ \cos(THS) & \sin(THS) \end{pmatrix}\begin{pmatrix} In\alpha \\ In\beta \end{pmatrix} \quad (2)$$

The current regulator ACR1 regulates its output (p-axis voltage command value Vpn0) so that the deviation of the p-axis current detection value Ipn from the p-axis current command value Ipnstr (i.e. the difference between two inputs) becomes 0, and outputs the regulated p-axis voltage command value Vpn0 to an adder 301. Similarly, the current regulator ACR2 regulates its output (q-axis voltage command value Vqn0) so that the deviation of the q-axis current detection value Iqn from a q-axis current command value (=0) becomes 0, and outputs the regulated q-axis voltage command value Vqn0 to an adder 302. Incidentally, the current regulators ACR1 and ACR2 can be formed with proportional-integral (PI) controllers, for example.

The three-to-two phase transformer 32TRS calculates an α component Vsα and a β component Vsβ from the system voltage detection value VSY inputted thereto by use of the following transformation equation (3), and outputs the components Vsα and Vsβ to the rotating coordinate transformer 3DQ02. The rotating coordinate transformer 3DQ02 calculates a p-axis voltage detection value Vps (phase component coinciding with the system voltage vector) and a q-axis voltage detection value Vqs (component orthogonal to the p-axis voltage detection value Vps) by use of the following equation (4), and outputs the voltage detection values Vps and Vqs to the adders 301 and 302, respectively.

$$\begin{pmatrix} Vs\alpha \\ Vs\beta \end{pmatrix} = \frac{2}{3}\begin{pmatrix} \cos(0) & \cos(2\pi/3) & \cos(4\pi/3) \\ \sin(0) & \sin(2\pi/3) & \sin(4\pi/3) \end{pmatrix}\begin{pmatrix} Vsu \\ Vsv \\ Vsw \end{pmatrix} \quad (3)$$

$$\begin{pmatrix} Vps \\ Vqs \end{pmatrix} = \begin{pmatrix} \sin(THS) & -\cos(THS) \\ \cos(THS) & \sin(THS) \end{pmatrix}\begin{pmatrix} Vs\alpha \\ Vs\beta \end{pmatrix} \quad (4)$$

The adder 301 adds the p-axis voltage command value Vpn0 and the p-axis voltage detection value Vps together and outputs the sum to the two-to-three phase rotating coordinate transformer DQ23-01. Similarly, the adder 302 adds the q-axis voltage command value Vqn0 and the q-axis voltage detection value Vqs together and outputs the sum to the two-to-three phase rotating coordinate transformer DQ23-01.

The two-to-three phase rotating coordinate transformer DQ23-01 receives the phase signal THS and the outputs Vpn and Vqn of the adders, calculates voltage command values Vun, Vvn and Vwn by use of the following transformation equations (5) and (6), and outputs the voltage command values Vun, Vvn and Vwn to a pulse calculator PWM1.

$$\begin{pmatrix} Va \\ Vb \end{pmatrix} = \begin{pmatrix} \sin(THS) & \cos(THS) \\ -\cos(THS) & \sin(THS) \end{pmatrix} \begin{pmatrix} Vpn \\ Vqn \end{pmatrix} \quad (5)$$

$$\begin{pmatrix} Vun \\ Vvn \\ Vwn \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Va \\ Vb \end{pmatrix} \quad (6)$$

The pulse calculator PWM1 calculates the gate signals P1 (gate signals P1_U, P1_V and P1_W for turning ON/OFF n semiconductor elements forming the system-side converter 2041) from the voltage command values Vun, Vvn and Vwn inputted thereto by means of pulse width modulation (PWM), and supplies the gate signals P1 (P1_U, P1_V, P1_W) to the system-side converter 2041.

Figure 6:
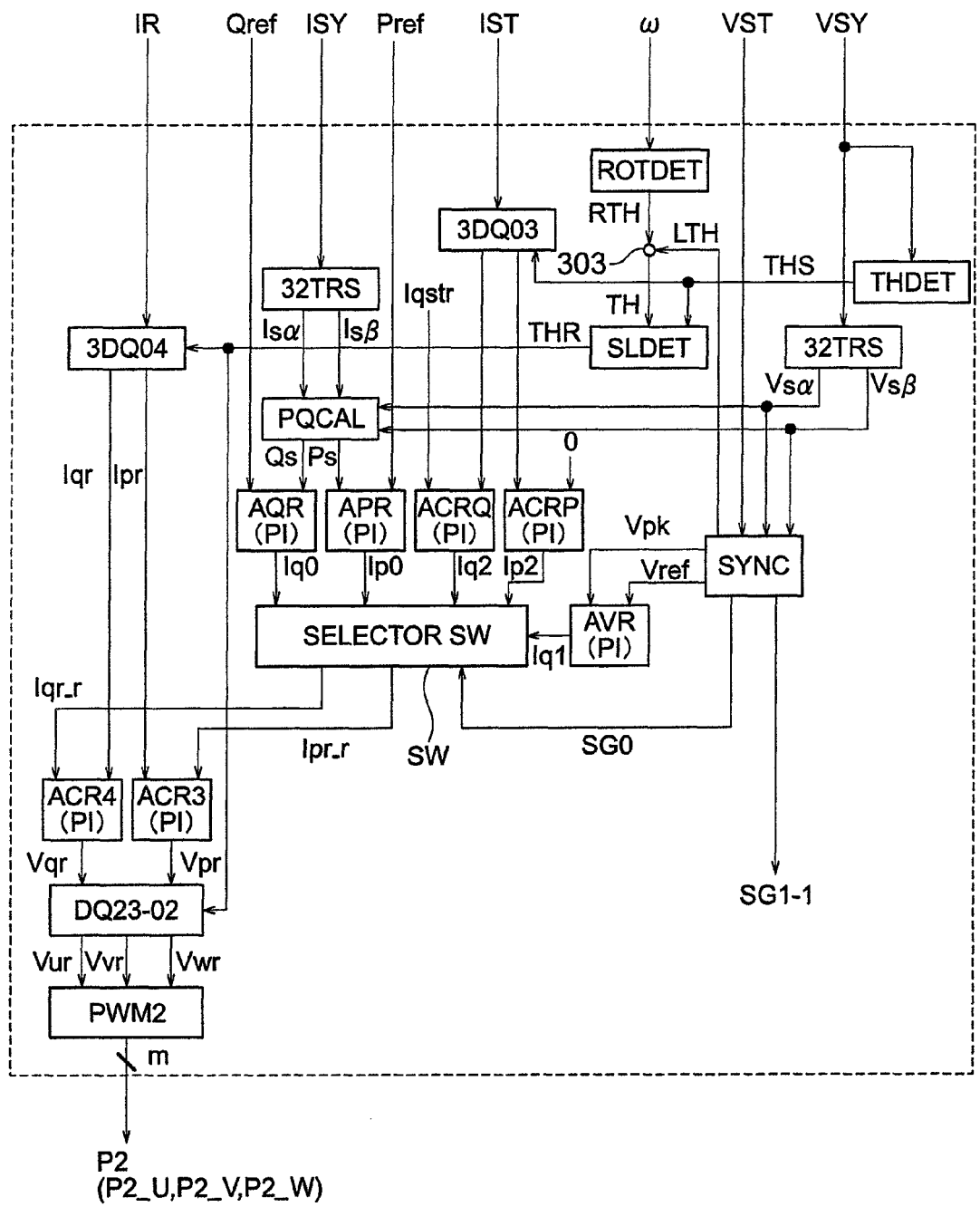
FIG. 6 is a schematic circuit diagram showing the control configuration of the generator-side converter.

Next, the control of the generator-side converter 2042 will be explained below referring to FIG. 6. FIG. 6 is a schematic circuit diagram showing the control configuration of the generator-side converter.

The revolving speed signal ω, indicating the revolving speed (angular speed) and the position of the generator 201, is inputted to a rotational phase detector ROTDET. The rotational phase detector ROTDET counts the number of pulses of the revolving speed signal ω and converts the number into a phase signal while periodically resetting the phase signal to 0 using a pulse that is generated once in one revolution (e.g. Z-phase pulse when an ABZ encoder is used), and outputs the phase signal RTH (indicating a phase from 0° to 360°) to an adder 303.

The phase signal RTH and a phase signal LTH outputted by a synchronization controller SYNC are added together by the adder 303 to form a phase signal TH. The phase signal TH is inputted to an excitation phase calculator SLDET together with the phase signal THS (described in the explanation of the control of the system-side converter 2041).

The excitation phase calculator SLDET calculates the difference between the phase signals THS and TH, multiplies the difference (THS−Th) by the number (k) of pairs of poles of the generator 201, obtains a phase signal THR regarding the electrical angular frequency of the rotor of the generator.

A power calculator PQCAL is supplied with α-axis current Isα and β-axis current Isβ (which are obtained by transforming the system current ISY using the transformation matrix in the equation (1)) and an α-axis voltage detection value Vsα and a β-axis voltage detection value Vsβ (which are obtained by the equation (3)), and calculates active power Ps and reactive power Qs of the system by the following equations (7).

$$Ps = 3(Vs\alpha \times Is\alpha + Vs\beta \times Is\beta)/2$$

$$Qs = 3(-Vs\alpha \times Is\beta + Vs\beta \times Is\alpha)/2 \quad (7)$$

An active power regulator APR, which is supplied with the active power Ps and an active power command value Pref of the wind power generation apparatus 20, outputs an active current command value Ip0 while regulating the output so that the deviation of the power detection value (active power) Ps from the active power command value Pref becomes 0. Incidentally, while an example employing the active power command is described here, it is also possible to employ a torque command instead. In such cases, the control can be carried out by converting the torque command into the active power command by multiplying the torque command by the revolving speed of the generator. In contrast with the torque control, the active power control has an advantage in that the output power can be maintained at a constant level even when the revolving speed of the generator changes.

Meanwhile, a reactive power regulator AQR, which is supplied with the reactive power Qs and a reactive power command value Qref of the wind power generation apparatus 20, outputs an excitation current command value Iq0 while regulating the output so that the deviation of the power detection value (reactive power) Qs from the reactive power command value Qref becomes 0. The power regulators APR and AQR can be formed with proportional-integral units, for example.

The active current command value Ip0 and the reactive power command value Qref outputted by the active power regulator APR and the reactive power regulator AQR are inputted to a selector SW.

Meanwhile, stator current IST is inputted to a three-to-two phase rotating coordinate transformer 3DQ03. The three-to-two phase rotating coordinate transformer 3DQ03 analyzes (transforms) the stator current IST into active current Ipst and reactive current Iqst by the transformation equations (1) and (2), and outputs the active current Ipst and the reactive current Iqst to generator current regulators ACRP and ACRQ, respectively.

The generator current regulator ACRP is supplied with the active current Ipst and a stator active current command value (=0), calculates a rotor current command value Ip2 so that the active component Ipst of the generator stator current becomes 0 (i.e. the stator active current command value), and outputs the rotor current command value Ip2 to the selector SW. Meanwhile, the generator current regulator ACRQ is supplied with the reactive current Iqst and a stator reactive current command value Iqstr, calculates a rotor current command value Iq2 so that the reactive component Iqst of the generator stator current becomes equal to the stator reactive current command value Iqstr, and outputs the rotor current command value Iq2 to the selector SW.

A voltage regulator AVR is supplied with the amplitude Vpk of the stator voltage detection value VST (as a feedback value) and a value Vref obtained by applying a filter FIL to the amplitude of the system voltage detection value VSY (as a command value), calculates an excitation current command value Iq1 so that the deviation of the feedback value (i.e. the amplitude Vpk of the stator voltage detection value VST) from the command value becomes 0, and outputs the excitation current command value Iq1 to the selector SW. The voltage regulator AVR can be formed with a proportional-integral controller, for example. The voltage regulator AVR, which is put into operation when the circuit breaker 208 is in the opened state, regulates the excitation current supplied from the generator-side converter 2042 to the secondary side of the generator 201 by outputting the excitation current command value Iq1, so as to equalize the amplitude of the stator voltage of the generator 201 with the amplitude of the system voltage.

Figure 7:
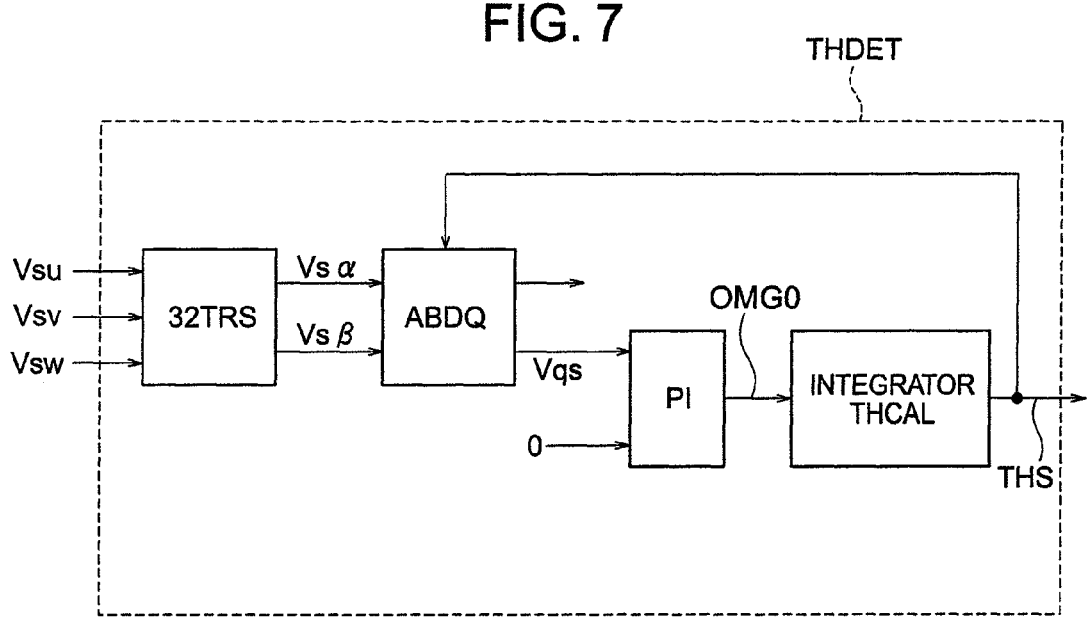
FIG. 7 is a schematic circuit diagram showing the configuration of a phase detector THDET included in the wind power generation apparatus of FIG. 1.

FIG. 7 is a schematic circuit diagram showing the configuration of the phase detector THDET. The phase detector THDET is supplied with the system voltage Vs (Vsu, Usv, Vsw). A three-to-two phase transformer 32TRS transforms the system voltage Vs (Vsu, Usv, Vsw) into two-phase voltage signals Vsα and Vsβ according to the equation (3). A rotating coordinate transformer ABDQ receiving the two-phase voltage signals Vsα and Vsβ calculates Vps and Vqs according to the coordinate transformation equation (4). Vqs becomes 0 when the phase THS calculated by the phase detector THDET coincides with the U-phase of the system voltage. Taking advantage of this fact, the phase THS is corrected so that Vqs becomes 0. For this, a frequency correction command (frequency correction value) OMG0 is generated by comparing Vqs with 0, and the frequency correction value OMG0 is inputted to an integrator THCAL. The integrator THCAL converts the frequency correction value (frequency signal) OMG0 into the phase signal THS by integrating the frequency signal OMG0.

Figure 8:
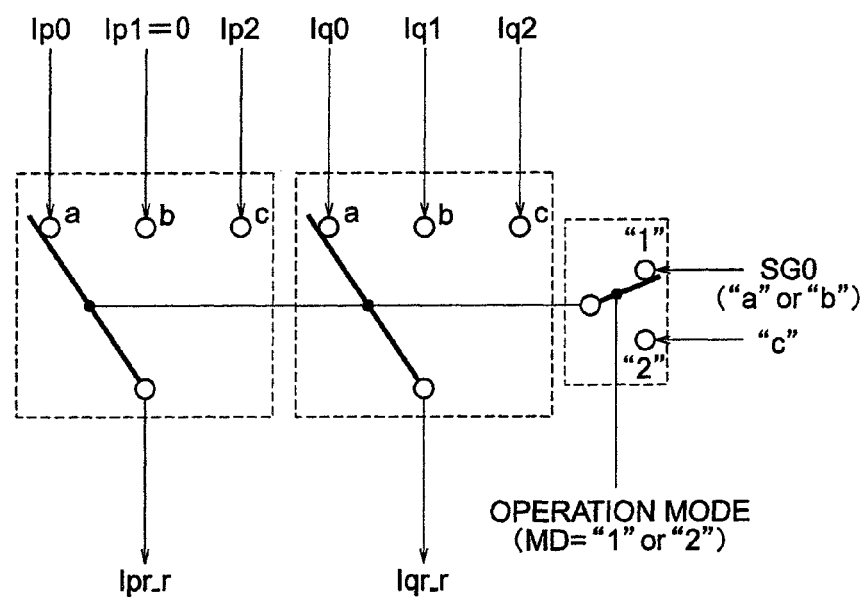
FIG. 8 is a schematic circuit diagram showing the configuration of a selector SW of the generator-side converter.

FIG. 8 is a schematic circuit diagram showing the configuration of the selector SW. The selector SW selects its outputs (Ipr_r, Iqr_r) from its inputs (Ip0, Ip1, Ip2, Iq0, Iq1, Iq2) depending on whether the current operation mode is a "normal power generation operation mode" (in which the outputs Ip0 and Iq0 of the power regulators APR and AQR are used), a "system synchronization operation mode" (in which "0" is used as the active current command value and the output Iq1 of the voltage regulator AVR is used as the excitation current command value), or a "system failure operation mode" (in which the outputs Ip2 and Iq2 of the stator current regulators (generator current regulators) ACRP and ACRQ for regulating the stator current of the generator are used).

Before the circuit breaker 208 is turned ON (i.e. in voltage synchronization operation in which the generator stator voltage is synchronized with the system voltage and a signal SG0 (see FIGS. 6 and 8) equals "b"), the selector SW employs (selects) "0" as the active current command value and the output Iq1 of the voltage regulator AVR as the excitation current command value. After the circuit breaker 208 is turned ON (signal SG0="a"), the selector SW selects the outputs Ip0 and Iq0 of the power regulators APR and AQR. In normal power generation operation, an operation mode signal representing the current operation mode MD remains at "1" and the above selection of command values depending on the turn-ON signal SG0 ("a" or "b") is made. On the other hand, when the operation mode MD shifts to "2" when a system failure or the like is detected, the outputs Ip2 and Iq2 of the stator current regulators (generator current regulators) ACRP and ACRQ are selected and outputted by the selector SW.

The synchronization controller SYNC has functions of judging whether the voltage amplitude of the generator is in synchronization or not based on the system voltage detection value VSY and the generator stator voltage detection value VST when the circuit breaker 208 is in the opened state, outputting the phase signal LTH (for correcting phase deviation between the stator voltage and the system voltage) when the phase of the stator voltage differs from that of the system voltage, and judging whether or not the phases of the stator voltage and the system voltage are within a prescribed range and in sync with each other. With the functions, the synchronization controller SYNC outputs the circuit breaker operation signal SG1 and the control switching signal SG0. When the circuit breaker 208 is shifted to the closed state by the signal SG1, the phase correction signal LTH retains its value at the moment.

By the functions of the synchronization controller SYNC, the synchronization of the generator 201 (stator voltage) with the system voltage is achieved before the generator 201 is connected to the system, and the control can be switched to power control immediately after the connection of the generator 201 to the power system.

A three-to-two phase rotating coordinate transformer 3DQ04 calculates a p-axis current detection value Ipr (active current component) and a q-axis current detection value Iqr (excitation current component) from the generator-side converter current IR and the rotor phase THR inputted thereto by use of the following transformation equations (8) and (9), and outputs the p-axis current detection value Ipr and the q-axis current detection value Iqr to current regulators ACR3 and ACR4, respectively.

$$\begin{pmatrix} Ir\alpha \\ Ir\beta \end{pmatrix} = \frac{2}{3} \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} Iru \\ Irv \\ Irw \end{pmatrix} \quad (8)$$

$$\begin{pmatrix} Ipr \\ Iqr \end{pmatrix} = \begin{pmatrix} \sin(THR) & -\cos(THR) \\ \cos(THR) & \sin(THR) \end{pmatrix} \begin{pmatrix} Ir\alpha \\ Ir\beta \end{pmatrix} \quad (9)$$

The current regulator ACR3 regulates its output (p-axis voltage command value Vpr) so that the deviation of the p-axis current detection value Ipr from the p-axis current command value Ipr_r (Ip0, Ip1 or Ip2) supplied from the selector SW becomes 0. Similarly, the current regulator ACR4 regulates its output (q-axis voltage command value Vqr) so that the deviation of the q-axis current detection value Iqr from the q-axis current command value Iqr_r (Iq1, Iq0 or Iq2) supplied from the selector SW becomes 0. The current regulators ACR3 and ACR4 can be formed with proportional-integral units, for example.

The p-axis voltage command value Vpr and the q-axis voltage command value Vqr are inputted to a two-to-three phase rotating coordinate transformer DQ23-02. The two-to-three phase rotating coordinate transformer DQ23-02 calculates voltage command values Vur, Vvr and Vwr from the inputs Vpr and Vqr and the phase signal THR inputted thereto by use of the following transformation equations (10) and (11), and outputs the voltage command values Vur, Vvr and Vwr to a pulse calculator PWM2.

$$\begin{pmatrix} Va \\ Vb \end{pmatrix} = \begin{pmatrix} \sin(THR) & \cos(THR) \\ -\cos(THR) & \sin(THR) \end{pmatrix} \begin{pmatrix} Vpr \\ Vqr \end{pmatrix} \quad (10)$$

$$\begin{pmatrix} Vur \\ Vvr \\ Vwr \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Va \\ Vb \end{pmatrix} \quad (11)$$

The pulse calculator PWM2 calculates the gate signals P2 (gate signals P2_U, P2_V and P2_W for turning ON/OFF m semiconductor elements forming the generator-side converter 2042) from the voltage command values Vur, Vvr and Vwr inputted thereto by means of pulse width modulation (PWM), and outputs the gate signals P2 (P2_U, P2_V, P2_W) to the generator-side converter 2042.

Next, the system failure countermeasure unit 212 will be explained below referring to FIGS. 9-12.

Figure 9:
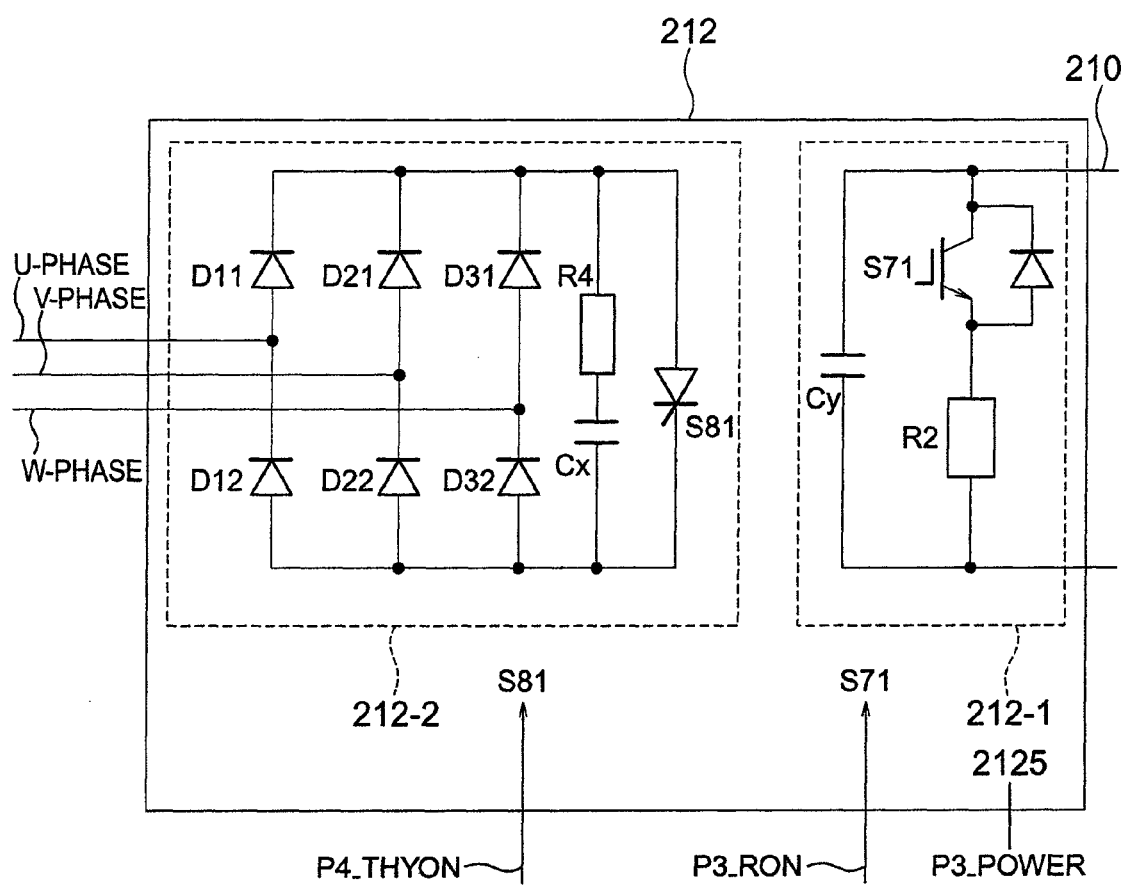
FIG. 9 is a schematic circuit diagram showing the configuration of a system failure countermeasure unit included in the wind power generation apparatus of FIG. 1.

FIG. 9 is a schematic circuit diagram showing the configuration of the system failure countermeasure unit 212. The system failure countermeasure unit 212 includes the energy consuming unit (overcurrent consuming unit) 212-1 and the shunt circuit 212-2. The AC inputs of the shunt circuit 212-2 are connected to secondary-side winding terminals of the generator 201. In this example, the shunt circuit 212-2 is mainly composed of diodes D11, D12, D21, D22, D31 and D32 and a thyristor S81. The shunt circuit 212-2 further includes a series circuit (a capacitor Cx and a resistor R4) in its DC part. The DC part of the shunt circuit 212-2 includes the thyristor S81 as a semiconductor switch.

Meanwhile, the energy consuming unit 212-1 includes a circuit in which a resistor R2 is connected in series with a semiconductor switch S71. The energy consuming unit 212-1 is connected to the DC part 210 of the converter 204.

In the event of a drop in the system voltage, overcurrent occurring in the rotor of the generator 201 flows into the DC part 210 of the generator-side converter 2042 and raises the DC voltage VDC (voltage of the DC part 210). However, the rise in the DC voltage VDC can be minimized by turning ON the semiconductor switch S71 and thereby making the resistor R2 consume the energy of the overcurrent flowing into the DC part 210.

A gate signal P3 for turning ON/OFF the semiconductor switch S71 is supplied from the converter controller 205. The gate signal P3 is shifted to an ON state when the DC voltage VDC reaches the upper limit of a prescribed range, and to an OFF state when the DC voltage VDC reaches the lower limit of the prescribed range. This judgment is made by the converter controller 205 by use of the DC voltage VDC inputted thereto.

The operation of the energy consuming unit 212-1 in this case will be described in detail below referring to FIG. 10. When a system failure is detected from overcurrent of the generator-side converter current IR, the gates of the system-side converter 2041 and the generator-side converter 2042 are stopped (P1_GB="0", P2_GB="0") and the gate signal P3 is shifted to the ON state (P3="1") (TIME: T0), by which the DC voltage VDC starts dropping. When the DC voltage VDC reaches the lower limit level Lv (TIME: T1), the gate signal P3 is turned OFF (P3="0"). In this case, if the current of the generator-side converter 2042 caused by the system failure has not been attenuated yet, the DC voltage VDC rises again and reaches the upper limit level Hv (TIME: T2), at which the gate signal P3 is turned ON again. The gate signal P3 remains ON until the DC voltage VDC drops to the lower limit level Lv (TIME: T3). By such operation of the energy consuming unit 212-1, the DC voltage VDC is kept within the range Lv<VDC<Hv during the system failure and after the recovery from the system failure.

Figure 11:
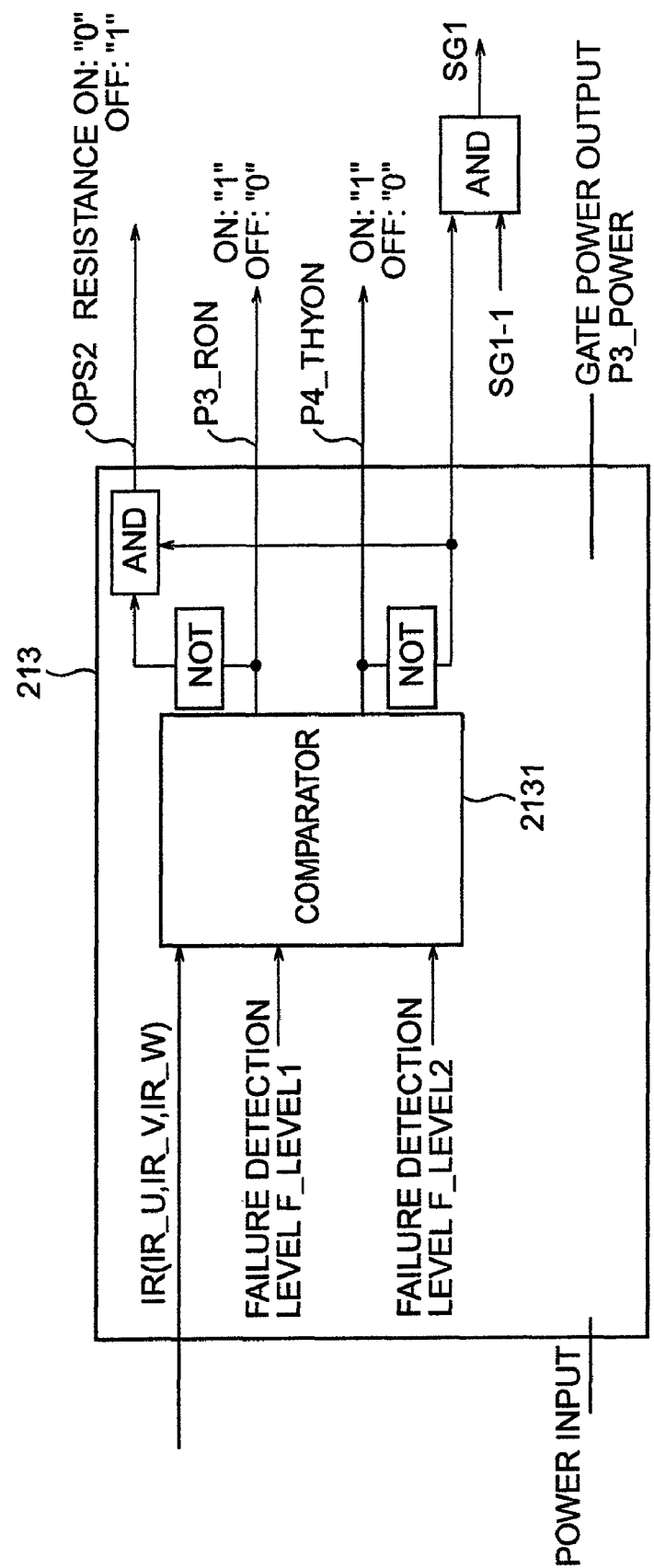
FIG. 11 is a schematic circuit diagram showing the control configuration of a system failure countermeasure unit controller for detecting overcurrent in the generator-side converter.

FIG. 11 is a schematic circuit diagram showing the control configuration of the system failure countermeasure unit controller 213 for detecting the overcurrent in the generator-side converter 2042. Each phase (IR_U, IR_V, IR_W) of the generator-side converter current IR is compared with an overcurrent detection level F_LEVEL1. When any one of IR_U, IR_V and IR_W exceeds the overcurrent detection level F_LEVEL1, gate stop signals (P1_GB="0", P2_GB="0") are outputted and the gate signal P3 is turned ON (P3="1"). In this case where the gate signal P3 is turned ON (P3="1"), an inversion signal OPS2 (inversion of the gate signal P3 which is ON) is outputted to the converter controller 205.

The thyristor S81 of the shunt circuit 212-2 is put into operation when the overcurrent (caused by system failure or short-circuit failure inside the generator) is at a detection level F_LEVEL2 or higher. For this, a signal P4_THYON (for turning the thyristor S81 ON) is set at "1" when the current of the generator-side converter 2042 is at the detection level F_LEVEL2 or higher.

The signal P4_THYON for the thyristor S81 is controlled as above for the following reason: When the overcurrent caused by a system failure is at a prescribed level (i.e. the detection level F_LEVEL2) or lower, the temperature of the freewheeling diodes of the elements S41-S62 of the generator-side converter 2042 does not rise to a high temperature causing trouble even if the current is fed through the diodes. However, when the overcurrent level is higher than F_LEVEL2, the elements S41-S62 can be broken by excessive temperature rise of the freewheeling diodes. By turning the thyristor S81 ON (P4_THYON="1"), the current passing through the freewheeling diodes can be reduced and the breakdown of the diodes can be prevented.

When the thyristor S81 is turned ON as above, the inversion of the signal P4 is sent to a logical product circuit AND to turn the signal SG1 OFF (="0"), in order to turn OFF the circuit breaker 208 at the same time.

Further, in this case where the thyristor S81 is turned ON, in order to turn OFF the gate signals for the system-side converter 2041 and the generator-side converter 2042, the inversion of the signal P4 is sent to another logical product circuit AND which generates a status signal OPS2 as the logical product of the inversion of the signal P4 and the inversion of the signal P3. By use of the status signal OPS2, the gates of the converter 204 (system-side converter 2041, generator-side converter 2042) can be stopped when either the signal P3 or P4 is ON.

After the thyristor S81 is turned ON as above, when the circuit breaker 208 shifts to the opened state, the current of the generator rotor drops to 0, by which the thyristor S81 turns OFF. Thereafter, when the system voltage has already recovered, the converter 204 starts a restart process. First, the system-side converter 2041 controls the DC voltage VDC to keep it at a prescribed level and then the generator-side converter 2042 starts exciting the rotor of the generator. If the thyristor S81 has failed into a short-circuit state at this time, the generator-side converter current IR becomes excessive, from which the failure of the thyristor S81 can be detected. Short-circuit failure inside the generator can also be detected from the status of the rotor current and the stator voltage.

Figure 12:
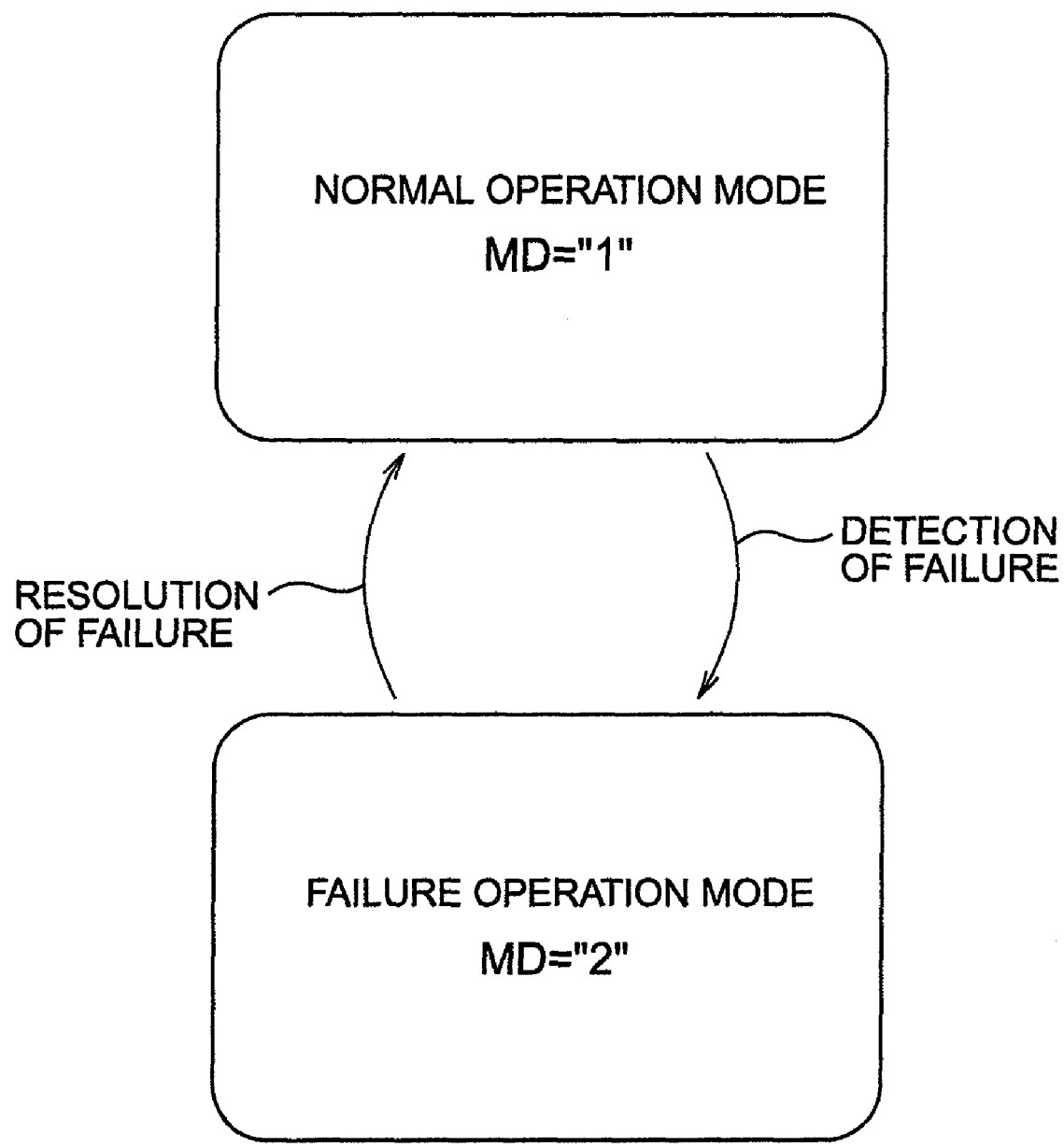
FIG. 12 is a state transition diagram showing transitions of the operation mode of the wind power generation apparatus.

Next, the operation modes ("MD" in FIG. 8) shown in FIG. 10 will be explained in more detail referring to a state transition diagram of FIG. 12. As shown in FIG. 12, the operation mode MD (operation mode signal) is set at "1" in normal power generation operation, and at "2" when a system failure such as a voltage drop is detected.

Figure 10:
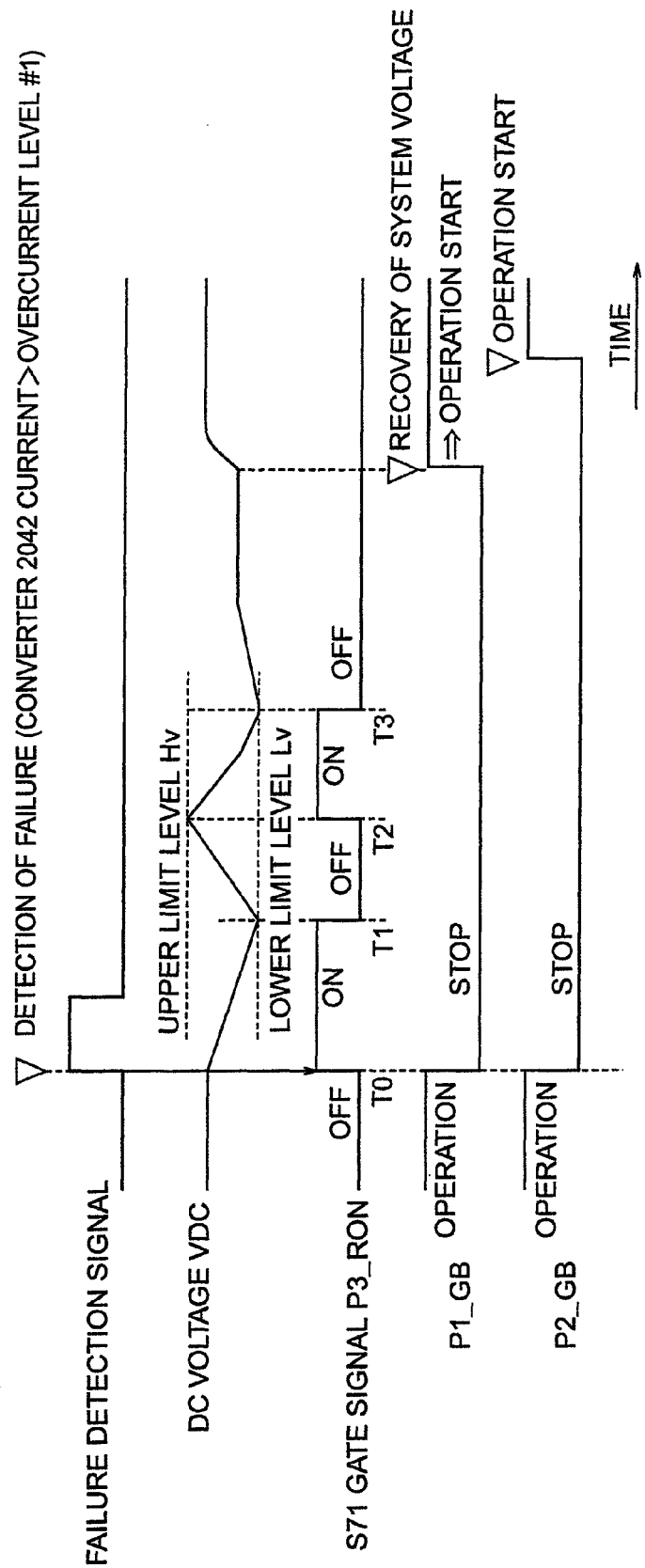
FIG. 10 is a timing chart for explaining the operation of an overcurrent consuming unit of the system failure countermeasure unit.

When overcurrent or excessively high/low voltage caused by the system failure has been eliminated and the wind power generation apparatus 20 has become operable, the operation is started by switching the operation mode into the failure operation mode (MD=2), by which the control shifts to the control of the generator stator current as explained referring to FIG. 10. The failure operation mode (MD=2) continues for a time period specified by the system specifications (e.g. E.ON GRID "CODE").

The voltage of the DC part of the converter 204 can be properly maintained while consuming the energy caused by the system failure, by connecting the energy consuming unit 212-1 to the DC part and turning the resistance R2 ON/OFF (i.e. turning ON/OFF the semiconductor switch S71) by the voltage level. Since the DC voltage of the generator-side converter 2042 is equal to or higher than the initial charging voltage level when the system failure countermeasure unit 212 finishes its operation, inrush current can be prevented (current flowing from the AC output of the system-side converter 2041 into the DC part 210 is small).

Since the controller (system failure countermeasure unit controller) 213 for the system failure countermeasure unit 212 is provided separately from the converter controller 205, the rotor current can be detected without fail and the converter 204 can be protected even when the converter controller 205 fails.

With the two detection levels set for detecting the overcurrent, the stopping of the gates of the converter 204 and the resistance ON/OFF operation by the chopper (semiconductor switch S71) at the first detection level, and the turning ON of the thyristor S81 (shunting the overcurrent into the thyristor S81) and the concurrent turning OFF of the synchronization switch (circuit breaker 208) at the second detection level, the semiconductor elements and the IGBT freewheeling diodes can be protected from overcurrent (caused by failure) beyond an assumed range, while the wind power generation apparatus 20 is allowed to stay on standby with the circuit breaker 208 ON and restart the operation quickly in cases where the failure is within the assumed range.

Embodiment 2

Figure 13:
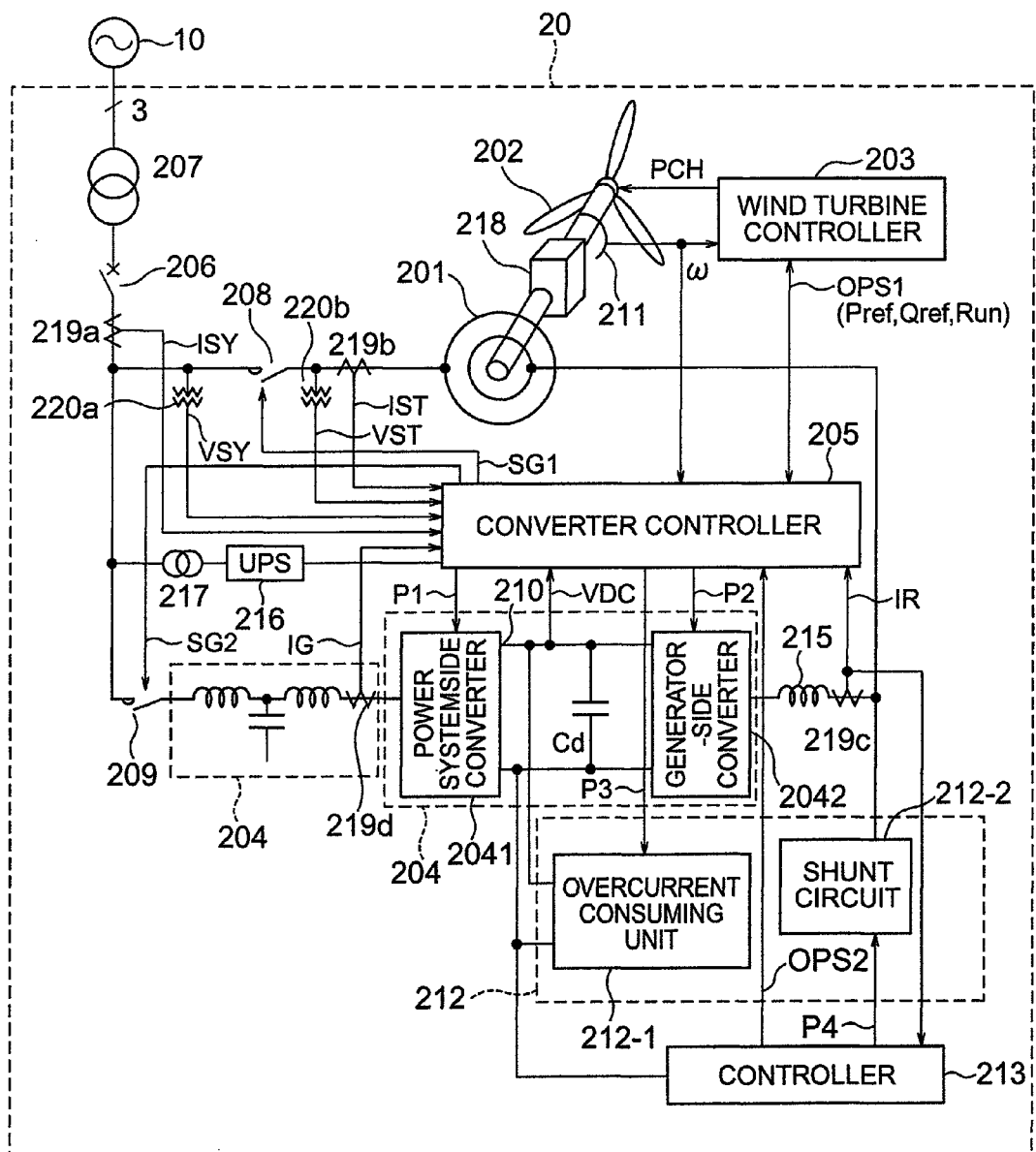
FIG. 13 is a schematic circuit diagram showing the circuit configuration of a wind power generation apparatus in accordance with a second embodiment of the present invention.

FIG. 13 is a schematic circuit diagram showing the circuit configuration of a wind power generation apparatus 20 in accordance with a second embodiment of the present invention, in which power supply to the system failure countermeasure unit controller 213 differs from that in the first embodiment.

In the second embodiment, the electric power for the system failure countermeasure unit controller 213 is supplied from the DC part 210 of the converter 204. The control power can be obtained from the DC part 210 of the converter 204 since the voltage of the DC part 210 is maintained within a prescribed range by the resistor R2 and the semiconductor switch S71.

With this configuration, the need of increasing the capacity of the uninterruptible power supply (UPS) 216 for the addition of the system failure countermeasure unit can be eliminated, as well as achieving the same effects as the first embodiment.

Embodiment 3

Figure 14:
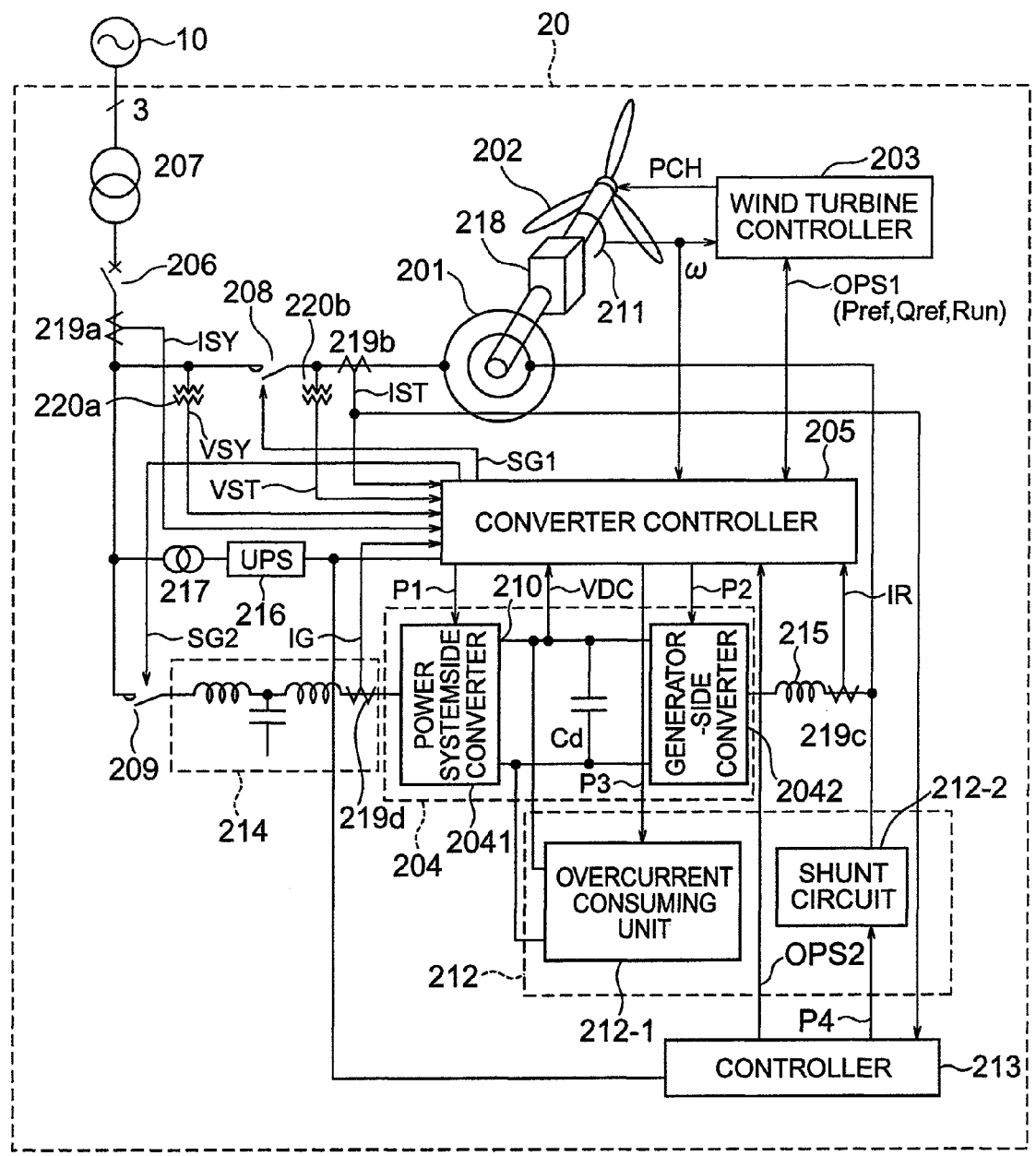
FIG. 14 is a schematic circuit diagram showing the circuit configuration of a wind power generation apparatus in accordance with a third embodiment of the present invention.

FIG. 14 is a schematic circuit diagram showing the circuit configuration of a wind power generation apparatus 20 in accordance with a third embodiment of the present invention, in which the sensor input to the system failure countermeasure unit controller 213 differs from that in the first embodiment.

In the third embodiment, the system failure countermeasure unit controller 213 makes the judgment on the system failure based on overcurrent of the stator current IST. The stator current IST, which becomes excessive in the event of a system failure similarly to the generator-side converter current IR, can also be used for the system failure judgment. Further, in case of a short circuit in a brush part of a rotor winding terminal, the generator-side converter current IR rises more sharply than the stator current IST (since the converter 204 is still in operation) and thereafter the rotor current attenuates when the converter stops. On the other hand, the overcurrent of the stator current IST continues even after the converter stops. Thus, by detecting and using the stator current IST as in this embodiment, judgment on generator failure becomes possible, as well as achieving the same effects as the first embodiment.

Incidentally, while the electric power for the system failure countermeasure unit controller 213 is supplied from the uninterruptible power supply 216 in this embodiment, the electric power may also be supplied from the DC part 210 of the converter 204 as in the second embodiment.

The present invention is applicable to the excitation power converter of a secondary excitation power generator, power generation apparatus, etc.

It should be further understood by those skilled in the art that although the foregoing description has been on embodiments of the invention, the invention is not limited thereto and various changes and modifications may be made without departing from the spirit of the invention and the scope of the appended claims.

The invention claimed is:

1. A wind power generation system in which a stator of an AC-excited power generator connected to a power system is connected with an AC part of a system-side converter, an AC part of a generator-side converter is connected with a rotor of the AC-excited power generator, a DC part of the system-side converter is connected with a DC part of the generator-side converter, and electric power is generated by rotating the rotor of the AC-excited power generator by a wind turbine which is connected to the rotor, wherein the wind power generation system comprises:
   an overcurrent consuming unit is connected to the DC part of the system-side converter and the generator-side converter in parallel with each other;
   the overcurrent consuming unit includes a semiconductor element and a resistor; and
   the resistor consumes energy of an overcurrent at the DC part thereby to suppress voltage rise at the DC part.

2. The wind power generation system according to claim 1, wherein the overcurrent consuming unit includes a series circuit including at least one active switch and a resistor.

3. The wind power generation system according to claim 2, wherein the overcurrent consuming unit includes a unit which turns the active switch ON when current of the generator-side converter exceeds a first threshold level.

4. The wind power generation system according to claim 1, further comprising a unit which makes the overcurrent consuming unit start operating when DC voltage of the converters is at an upper limit level and stop operating when the DC voltage is at a lower limit level.

5. The wind power generation system according to claim 4, further comprising a unit which stops gates of the generator-side converter and the system-side converter when the overcurrent consuming unit operates.

6. The wind power generation system according to claim 1, further comprising a shunt circuit which is connected between the rotor and the generator-side converter.

7. The wind power generation system according to claim 6, wherein the shunt circuit includes a diode rectifier and a semiconductor switch.

8. The wind power generation system according to claim 6, further comprising a unit which allows current to pass through the shunt circuit when current of the generator-side converter exceeds a second threshold level.

9. The wind power generation system according to claim 8, further comprising a unit which outputs an opening signal to a circuit breaker connected between the stator and the power system when the current is fed through the shunt circuit.

10. The wind power generation system according to claim 9, further comprising a restarting unit which successively restarts the system-side converter and the generator-side converter after confirming the opening of the circuit breaker and closes the circuit breaker after voltages on the stator-side and system-side of the circuit breaker are synchronized with each other.

11. The wind power generation system according to claim 7, further comprising a unit which makes the semiconductor switch operate when overcurrent has occurred to the stator.

12. The wind power generation system according to claim 3, further comprising:
   a shunt circuit which is connected between the rotor and the generator-side converter; and a unit which allows current to pass through the shunt circuit when current of the generator-side converter exceeds a second threshold level which is higher than the first threshold level.

13. A control method of a wind power generation system in which a stator of an AC-excited power generator connected to a power system is connected with an AC part of a system-side converter, an AC part of a generator-side converter is connected with a rotor of the AC-excited power generator, a DC part of the system-side converter is connected with a DC part of the generator-side converter, and electric power is generated by rotating the rotor of the AC-excited power generator by a wind turbine which is connected to the rotor, wherein:
the DC part shared by the generator-side converter and the system-side converter is equipped with an overcurrent consuming unit,
the overcurrent consuming unit is put into operation when an overcurrent of the generator-side converter is detected,
the overcurrent consuming unit is connected to the DC part of the system-side converter and the generator-side converter in parallel with each other;
the overcurrent consuming unit includes a semiconductor element and a resistor; and
the resistor consumes energy of the overcurrent at the DC part thereby to suppress voltage rise at the DC part.

14. The control method according to claim 13, wherein:
the operation of the overcurrent consuming unit is started when DC voltage of the converters is at an upper limit level or the overcurrent of the generator-side converter is detected, and
the operation of the overcurrent consuming unit is stopped when the DC voltage of the converters is at a lower limit level.

15. The control method according to claim 14, wherein gates of the generator-side converter and the system-side converter are stopped when the overcurrent consuming unit operates.

16. A control method of a wind power generation system in which a stator of an AC-excited power generator connected to a power system is connected with an AC part of a system-side converter, an AC part of a generator-side converter is connected with a rotor of the AC-excited power generator, a DC part of the system-side converter is connected with a DC part of the generator-side converter, and electric power is generated by rotating the rotor of the AC-excited power generator by a wind turbine which is connected to the rotor, wherein:
the DC part shared by the generator-side converter and the system-side converter is equipped with an overcurrent consuming unit,
the overcurrent consuming unit is connected to the DC part of the system-side converter and the generator-side converter in parallel with each other;
the overcurrent consuming unit includes semiconductor element and a resistor;
the resistor consumes energy of the overcurrent at the DC part thereby to suppress voltage rise at the DC part;
a shunt circuit, including a diode rectifier and a semiconductor switch, is connected between the rotor and the generator-side converter, and
a signal for turning ON the semiconductor switch is supplied thereto when overcurrent has occurred to the generator-side converter.

17. The control method according to claim 16, wherein an OFF signal is supplied to a circuit breaker connecting the stator with the power system when the semiconductor switch is turned ON.

18. The control method according to claim 17, wherein:
the system-side converter and the generator-side converter are successively restarted after the turning OFF of the circuit breaker is confirmed, and
the circuit breaker is turned ON after stator voltage and system voltage are synchronized with each other.

19. The control method according to claim 16, wherein the shunt circuit is put into operation by overcurrent of generator stator current.

20. A wind power generation system in which a stator of an AC-excited power generator connected to a power system is connected with an AC part of a system-side converter, an AC part of a generator-side converter is connected with a rotor of the AC-excited power generator, a DC part of the system-side converter is connected with a DC part of the generator-side converter, and electric power is generated by rotating the rotor of the AC-excited power generator by a wind turbine which is connected to the rotor, wherein the wind power generation system comprises:
an overcurrent consuming unit is connected to the DC part of the system-side converter and the generator-side converter in parallel with each other;
the overcurrent consuming unit includes a semiconductor element and a resistor;
the resistor consumes energy of the overcurrent at the DC part thereby to suppress voltage rise at the DC part;
a shunt circuit which is connected between the rotor and the generator-side converter; and
a unit which stops switching operation of the generator-side converter and the system-side converter when either the overcurrent consuming unit or the shunt circuit is put into operation, while changing or maintaining a blade angle of the wind turbine so as to maintain revolving speed of the wind turbine.

21. The wind power generation system according to claim 1, further comprising:
a shunt circuit connected between the rotor and the generator-side converter; and
a circuit breaker connected between the stator and the power system, wherein,
when a current of the generator-side converter exceeds a predetermined level, the shunt circuit passes a current therethrough, and
when the current passes through the shunt circuit, an opening signal provided to the circuit breaker to open the circuit breaker.

22. The wind power generation system according to claim 20, further comprising:
a shunt circuit connected between the rotor and the generator-side converter; and
a circuit breaker connected between the stator and the power system, wherein,
when a current of the generator-side converter exceeds a predetermined level, the shunt circuit passes a current therethrough, and
when the current passes through the shunt circuit, an opening signal provided to the circuit breaker to open the circuit breaker.

* * * * *